US 8,578,491 B2
Nov. 5, 2013

(12) United States Patent
McNamee et al.

(54) NETWORK BASED MALWARE DETECTION AND REPORTING

(75) Inventors: Kevin McNamee, Ottawa (CA); Denny Lung Sun Lee, Ottawa (CA); Robert Gaudet, Ottawa (CA); Arvavind K. Mistry, Ottawa (CA); Paul Edwards, Ottawa (CA)

(73) Assignee: Alcatel Lucent, Paris (FR)

(*) Notice: Subject to any disclaimer, the term of this patent is extended or adjusted under 35 U.S.C. 154(b) by 937 days.

(21) Appl. No.: 12/636,435

(22) Filed: Dec. 11, 2009

(65) Prior Publication Data
US 2010/0154059 A1 Jun. 17, 2010

Related U.S. Application Data
(60) Provisional application No. 61/121,896, filed on Dec. 11, 2008.

(51) Int. Cl.
G06F 11/00 (2006.01)
G06F 12/14 (2006.01)
G06F 12/16 (2006.01)
G08B 23/00 (2006.01)
G06F 15/173 (2006.01)

(52) U.S. Cl.
USPC ............................. 726/23; 709/223; 726/25

(58) Field of Classification Search
USPC ........................................................ 726/23
See application file for complete search history.

(56) References Cited

U.S. PATENT DOCUMENTS 7,246,156 B2 * 7/2007 Ginter et al. ................. 709/217
7,454,792 B2 * 11/2008 Cantrell et al. ............... 726/25
7,661,136 B1 * 2/2010 Spielman ...................... 726/22
7,779,463 B2 * 8/2010 Stolfo et al. .................. 726/22
8,010,469 B2 * 8/2011 Kapoor et al. ................ 706/20
8,020,192 B2 * 9/2011 Wright et al. ................... 726/1
8,020,207 B2 * 9/2011 Chow et al. ................... 726/22
8,042,178 B1 * 10/2011 Fisher et al. .................. 726/22
8,131,849 B2 * 3/2012 Narasimhan ................. 709/224
8,180,892 B2 * 5/2012 Deridder et al. ............. 709/224
8,234,705 B1 * 7/2012 Roskind et al. .............. 726/22
8,255,997 B2 * 8/2012 Cheswick ..................... 726/23
8,256,003 B2 * 8/2012 Dadhia et al. ................ 726/25
8,347,394 B1 * 1/2013 Lee ............................... 726/25
2007/0294369 A1 * 12/2007 Ginter et al. ................. 709/217
2008/0016208 A1 * 1/2008 Treinen ........................ 709/224
2008/0052395 A1 * 2/2008 Wright et al. ................. 709/224
2008/0127306 A1 * 5/2008 Blumfield et al. .............. 726/3
2008/0147837 A1 * 6/2008 Klein et al. ................... 709/223
2008/0196104 A1 * 8/2008 Tuvell et al. .................. 726/24

(Continued)

FOREIGN PATENT DOCUMENTS

WO WO 2008090531 A2 * 7/2008 ............ H04L 29/06

Primary Examiner — Carolyn B Kosowski
(74) Attorney, Agent, or Firm — OSHA Liang, L.L.P.

(57) ABSTRACT

An apparatus, system and method are described for use in detecting the presence of malware on subscribers computers. The apparatus, system and method are network based and may be deployed within an Internet Service Provider (ISP) network. The system may include a plurality of network sensors for receiving and analyzing network traffic to determine the presence of malware. An aggregating apparatus receives alerts of the presence of malware and translates a network identifier of the alert to a subscriber identifier. The aggregating apparatus aggregates alert information and forwards it to a reporting infrastructure that can generate notifications in order to notify a subscriber that malware has been detected on a computer associated with the subscriber.

19 Claims, 7 Drawing Sheets

(56) References Cited

U.S. PATENT DOCUMENTS

| | | | |
|---|---|---|---|
| 2008/0244742 A1* | 10/2008 | Neystadt et al. | 726/23 |
| 2008/0276297 A1* | 11/2008 | Shay | 726/1 |
| 2009/0158430 A1* | 6/2009 | Borders | 726/23 |
| 2010/0020700 A1* | 1/2010 | Kailash et al. | 370/242 |
| 2010/0023598 A9* | 1/2010 | Ginter et al. | 709/217 |
| 2010/0083378 A1* | 4/2010 | Cheswick | 726/23 |
| 2010/0161795 A1* | 6/2010 | Deridder et al. | 709/224 |
| 2010/0268818 A1* | 10/2010 | Richmond et al. | 709/224 |
| 2011/0197278 A1* | 8/2011 | Chow et al. | 726/24 |
| 2012/0017278 A1* | 1/2012 | Fisher et al. | 726/24 |
| 2012/0096558 A1* | 4/2012 | Evrard | 726/25 |
| 2012/0255019 A1* | 10/2012 | McNamee et al. | 726/24 |

* cited by examiner

NETWORK BASED MALWARE DETECTION AND REPORTING

CROSS-REFERENCE TO RELATED APPLICATIONS

This application claims priority, under 35 U.S.C. §119(e), to U.S. Provisional Patent Application Ser. No. 61/121,896, filed on Dec. 11, 2008. U.S. Provisional Patent Application Ser. No. 61/121,896 is hereby incorporated by reference in its entirety.

TECHNICAL FIELD

The present disclosure relates to the field of malicious software (a.k.a. malware) detection. In particular, the present disclosure relates to a network based malware detection system.

BACKGROUND

Malware infection is a major problem for users of Internet connected network devices, such as for example computers, cell-phones, iPod™, personal digital assistants (PDA). Malware comes in a number of forms such as, for example, virus, worm, spyware, adware, Trojan, bot, root-kit, and other similar forms of malware. Infection by malware can cause a device to malfunction, reveal personal information, participate in illegal activities, reinfect others and cause embarrassment and liability to the owners of the infected devices.

Various intrusion-detection system (IDS) mechanisms have tried to address this threat. Typically each of the known IDS mechanisms has implementation drawbacks. For example, host based detection systems require detection software on the host system. Some users object to having to run invasive, and potentially performance impacting, software on their computing device. Existing network based systems typically focus on who and what are being attacked rather than detecting evidence of infection and are not designed to inform the end-user that an infection has been detected Although intrusion detection system that can be used to detect malware based on traffic on a network, these systems are typically intended for deployment on a single computer or small network. The current intrusion detection systems cannot scale to a large enough deployment in order to effectively determine malware infections of computers attached to a large network, such as an Internet Service Provider's (ISP) network. These networks may commonly have millions or tens of millions of subscribers connected.

It is therefore desirable to have a system that can detect the presence of malware on computers connected to a large network.

SUMMARY

In accordance with an illustrative embodiment of the present disclosure there is provided a system for network based detection of malware on a plurality of client computers connected to a network. The system comprises a network sensor coupled to the network for generating detailed alerts based on one or more received packets associated with a client computer of the plurality of client computers. The network sensor comprises a detection engine for detecting the presence of malware on the client computer by comparing data provided within the one or more packets to an alert signature to identify malware behaviour, an alert generation module for generating an alert when the detection engine detects the presence of malware on the client computer. The alert comprises a network identifier associated with the client computer; and an identifier associated with the detected malware. The system further comprises an aggregator coupled to the network, the aggregator for translating network identifiers in one or more alerts associated with the client computer to corresponding subscriber identifiers and generating alert summaries based on the alerts and corresponding subscriber identifier and a reporting infrastructure for receiving the one or more alert summaries and generating one or more subscriber malware notifications.

In accordance with a further illustrative embodiment of the present disclosure there is provided an apparatus for aggregating a plurality of alerts associated with one or more client computers coupled to a network. The apparatus comprises a computer readable memory for storing instructions; and a processing unit for executing the instructions stored in the computer readable memory, when executed by the processing unit, the instructions configuring the apparatus to provide a subscriber identification translator for receiving an alert of the plurality of alerts, the alert comprising a network identifier associated with one of the plurality of client computers and a malware identifying a malware detected in network traffic associated with the client computer, the subscriber identification translator further for replacing the network identifier in the alert with a subscriber identifier associated with the network identifier, and an alert aggregator for determining one or more summary alerts, each summary alert corresponding to one or more alerts each having the same subscriber identifier and comprising the subscriber identifier and an indication of the number of alerts associated with the subscriber, the alert aggregator further for reporting the one or more summary alerts.

In accordance with a still further illustrative embodiment of the present disclosure there is provided a network based method of detecting the presence of malware on a plurality of client computers connected to a network. The method comprises receiving one or more packets at a network sensor, each packet associated with a client computer of the plurality of client computers, detecting at the network sensor the presence of malware on the client computer by comparing the one or more packets to an alert signature to identify malware behaviour; generating at the network sensor a detailed alert when the detection engine detects the presence of malware on the client computer. The detailed alert comprises an identifier associated with the client computer; a malware identifier indicating the detected malware; and a time stamp. The method further comprises sending one or more detailed alerts generated at the network sensor to an aggregator; receiving at the aggregator the one or more detailed alerts; replacing the identifier associated with the client computer in each of the received one or more detailed alerts with a subscriber identifier associated with the identifier; aggregating one or more detailed alerts having the same subscriber identifier into a single alert summary associated with the subscriber identifier; and sending one or more alert summaries associated with different subscriber identifiers to a reporting infrastructure.

BRIEF DESCRIPTION OF THE DRAWINGS

Various embodiments of a network based malware detection system will be described with reference to the figures in which.

DETAILED DESCRIPTION

Figure 1:
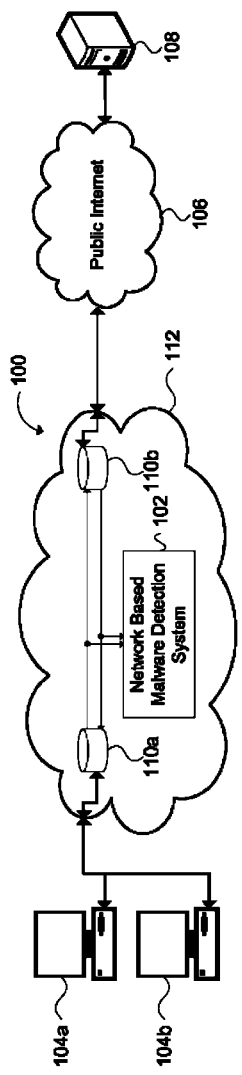
FIG. 1 depicts in a block diagram an environment in which a network-based malware detection system may be used.

FIG. 1 depicts in a block diagram an environment in which a network-based malware detection system may be used. The network-based detection system 102 (sometimes referred to as the system 102) may be used in order to identify malware infections on subscribers' computers 104a, 104b (referred to generally as 104) by inspecting network traffic to and from the subscribers' computers 104. The subscribers' computers 104 are coupled to the public Internet 106 through an Internet Service Provider (ISP) network 112. Typically an ISP provides a subscriber access to the ISP network 112 for a monthly fee, although other arrangements are possible.

The ISP network 112 comprises a plurality of routers or switches for directing network traffic between two endpoints, such as a subscriber computer 104a and a web site provided by a web server 108 on the public Internet 106. The system 102, or parts thereof as described further below, is deployed within the ISP network in order to capture and analyze the network traffic. Using the analyzed traffic, the system 102 can determine if a subscriber's computer 104 is infected with malware. If the system 102 determines that a subscriber's computer 104 is infected, it can provide a notification to the subscriber directing them to remedy the infection.

The system 102 helps to ensure that computers 104 connected to the ISP network are not infected with malware. This aides in the safe and reliable functioning of the ISP network 112. Furthermore, since the system 102 is network based, it is not necessary to have the subscriber download, install or update software. This can help ensure that all of the components in the system are utilizing the most current malware detection means as possible.

Figure 2:
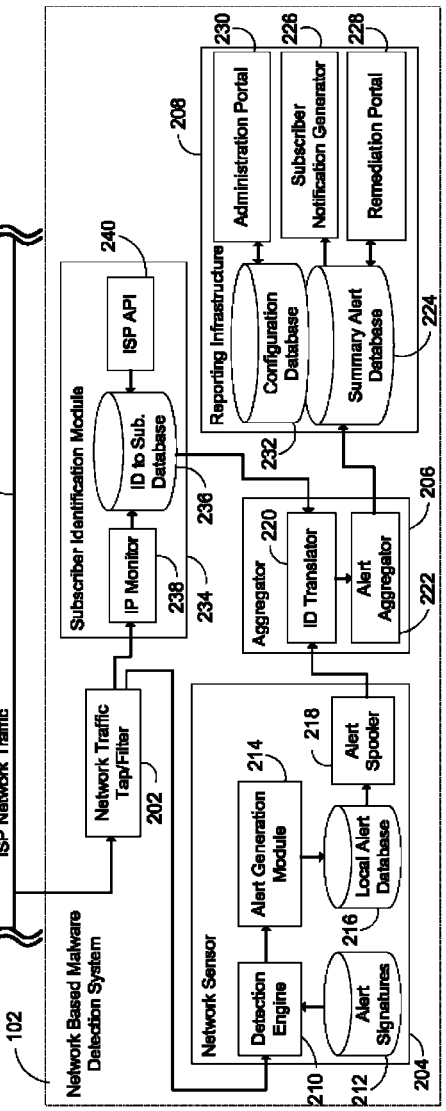
FIG. 2 depicts in a functional schematic illustrative components of a network based malware detection system.

FIG. 2 depicts in a functional schematic illustrative components of a network based malware detection system. The system 102 captures and analyzes network traffic on an ISP network 112. The network traffic is captured by a network tap/filter device 202 that is capable of copying packets of information travelling over the ISP network 112. The networktap/filter device may support one or more 10 Gigabit Ethernet (GE) network interfaces. The network tap/filter device 202 captures the packets and may filter the packets in order to redirect specific packets to different locations. The network tap/filter device 202 filters out packets that may be analyzed in order to detect malware infections of computers connected to the ISP network. The packets filtered out by the network tap/filter device 202 may include, for example Internet Protocol (IP) packets, including both IPv4 and IPv6 packets. The IP packets of the filtered events may correspond to normal subscriber activity expected on an uninfected computer such as, for example, Hyper Text Transfer Protocol (HTTP) traffic activity associated with, for example, viewing web pages. The filtered packets may also correspond to activity that is expected from a computer that is infected with malware. The network tap/filter device 202 may filter out the packets using for example, source and destination network identifiers, source and destination port numbers as well as protocol information of the packets processed by the network tap/filter device 202. The packets are passed on to a network sensor 204 that analyzes the packets in order to determine if the packets are due to a malware infection on a computer.

The network sensor 204 comprises a detection engine 210 that analyzes the received packets using signature based matching. The signatures used by the detection engine 210 may be stored in a repository, such as a local database. The signatures specify the characteristics that the malware network traffic will have. This includes data patterns that may be present in network packets, state information associated with the network protocols, and sequences of events that may be considered anomalous network behaviour. These signatures are expressed as detection engine rules. When the detection engine 210 detects a packet or sequence of packets that matches a specific rule it generates an alert event using the alert generation module 214. The detection engine rule includes a signature for detecting malware in the network traffic as well as an action to take when the rule is matched. The action instructs the alert generation module 214 to generate an alert event. The rule also includes a signature identifier that can be used to determine which signature caused an alert event to be generated.

The alert events generated by the alert generation module 214 are typically small in size, in order to reduce the amount of input/output (JO) processing that must be done by the detection engine 210. Reducing the amount of JO processing done by the detection engine 210 helps the detection engine 210 to compare packets and signatures quicker. The alert events may be stored to memory, or other local storage, for further processing, either by the network sensor 204 or other components of the system 102.

The network sensor 204 may further comprise an alert spooler 218 which reads the alert events generated by the alert generation module 214 stored in the memory and processes them and forwards them to other components of the system 102. The forwarded alert may comprise the IP addresses of the packet that generated the alert event. For example if the packet that caused the alert event to be generated is an HTTP event the IP addresses may include a source IP address of a subscriber's computer that requested a web page, and a destination IP address of the web page or web site requested. The detailed alert may comprise details on the generated alert event, such as an identifier of the signature that resulted in the match, the packet that was matched, header information of the packet that was matched, flags relating to the context in which the alert event was generated and/or a time stamp indicating the time the alert event was generated. Additionally the forwarded alerts may comprise additional information not contained in the alert generated by the detection engine 210.

In an illustrative embodiment, the detection engine 210 and alert generation module 214 may be implemented using SNORT®, which provides a rules-based detection engine that compares packets to signatures of rules and generates alert events when a packet matches a signature. The rules used by SNORT® define an action to take when a match to the signature occurs. The signature defines matching information including, for example, the protocol of the packet, source IP address, source port, direction of the packet, destination IP address, destination port and optionally one or more option keyword—argument pairs. One skilled in the art will appreciate the use of SNORT® and signatures as described in the SNORT® User Manual 2.8.4 published Sep. 18, 2008 may be replaced for other detection engines that are capable of comparing rules to packets and generating alert event. SNORT® may generate the alert events using unified output, which reduces the amount of IO processing done by SNORT®.

In an illustrative embodiment the alert spooler 218 may be implemented as a Barnyard plug-in which is capable of reading the unified alert logs written by SNORT® and forwarding corresponding alerts.

In the illustrative embodiment, once SNORT® generates an alert event it may store it in a local alert repository 216. An alert spooler 218, which in an illustrative embodiment may be provided by a Barnyard plug-in, may then access the local alert repository 216 and retrieve a plurality of alert events to be forwarded to other components in the system 102. In an illustrative embodiment the alert spooler 218 forwards alerts upon reading the corresponding alert event from the local alert repository 216. Alternatively the alert spooler 218 may be configurable to forward a plurality of alerts at regular intervals, such as every hour, twice a day, once a day, etc. Additionally or alternatively, the alert spooler 218 may be configured to forward the alerts once a threshold number of new, or un-forwarded, detailed alerts have been generated by the alert generation module 214 and stored in the local alert repository 214.

The alert spooler 218 of the network sensor 204 may forward the alerts, using the ISP network 112, to an aggregator 206. The aggregator 206 comprises an ID translator 220 that is capable of translating a network identifier, such as an IP address, to an associated subscriber identifier, such as a user name or account number of a subscriber, a media access control (MAC) address assigned to the subscriber, network access server (NAS) port number, etc. The ID translator 220 may modify the received alerts that were forwarded from the network sensor 204 in order to replace the network identifier (ID) with the corresponding subscriber ID. Alternatively, the ID translator 220 may not replace network ID with the subscriber ID but may instead associate the subscriber ID with the alert. The ID translator 220 may retrieve the subscriber ID associated with the network ID from a subscriber identification component 234.

The subscriber identification component 234 may comprise a network ID to subscriber ID repository 236 that stores the subscriber IDs and the current network ID associated with the subscriber ID. As will be appreciated, the network ID assigned to a particular subscriber ID may change, and as such a mechanism is needed in order to keep track of the current network ID to subscriber ID associations. Two possible mechanisms are depicted in FIG. 2. The subscriber identification component 234 may comprise an IP monitor 238 that receives messages forwarded from the network tap/filter device 202. The messages forwarded to the IP monitor 238 may include messages that may modify the current network ID/subscriber ID association, such as for example dynamic host configuration protocol (DHCP) messages or remote authentication dial in user service (RADIUS) messages. The IP monitor 238 analyzes the messages to determine if the messages provide a new network ID to subscriber ID association and updates the network ID to subscriber ID repository with any new associations as appropriate.

Additionally, or alternatively, the network ID to subscriber ID repository 236 may be populated using an ISP application programming interface (API) 240. The ISP API may return the current associations from the ISP. Additionally, or alternatively the ID translator 220 may make use of the ISP API 240 directly in order to request the subscriber ID of the network ID that is to be translated if no current association is stored in the repository 236, or the association is out of date. New associations retrieved using the ISP API 240 may be stored in the network ID to subscriber ID repository 236.

Once the ID translator 220 has modified the detailed alert with the subscriber ID, it is passed to an alert aggregator 222. The alert aggregator 222 reduces the amount of alert information in order to allow the system 102 to scale to large deployments. The alert aggregator 222 aggregates the alerts on a per subscriber basis to generate a summary alert for each subscriber that has at least one associated alert. In an illustrative embodiment there will be a single summary alert for each unique malware instance as identified by the signature ID) associated with a specific subscriber. The summary alert for a subscriber may provide a counter for the number of alerts generated from a particular signature. For example if a subscriber has a computer infected with two pieces of malware, a large number of detailed alerts may be generated based on the traffic generated by each piece of malware. The subscriber's summary alert may indicate the number of detailed alerts generated from a signature for the first piece of malware as well as the number of detailed alerts generated from the signature for the second piece of malware. Additional information may also be aggregated by the aggregator 206 including a total number of detailed alerts generated for a subscriber, as well as a number of detailed alerts generated by all subscribers for a particular piece of malware, and a total number of detailed alerts generated by all subscribers for all malware. The alert aggregator 222 may forward the generated summary alerts, and optionally the additional summary information, to other components of the system 102.

It will be appreciated that the alert aggregator 222 may periodically forward the generated summary alerts, for example every hour, twice a day, once a day, etc. The alert aggregator 222 may also be configured to forward the summary alerts as soon as possible. It will also be appreciated that the frequency at which the alert aggregator 222 forwards the summary alerts may differ from the frequency at which the network sensor forwards detailed alerts to the aggregator 206. Additionally, the alert aggregator 222 may reset the detailed alert counts used for tracking the number of detailed alerts generated for subscribers, as well as for the network, once the summary alerts, and additional summary information has been forwarded. The alert aggregator 222 may also forward the detailed alerts to additional components of the system 102. Although the detailed alerts are not required for further processing by the system, it may be desirable to store them.

The alert aggregator 222 may forward the summary alerts to a reporting infrastructure 208. The reporting infrastructure 208 comprises a summary alert repository 224 for storing the summary alerts received from the aggregator 206. Although the specific summary alerts received may be saved in the summary alert repository 224; the received summary alerts are combined with the summary alerts currently stored for a corresponding subscriber, if any. For example, if the aggregator 206 had previously forwarded, and the summary alert repository 224 stored, a summary alert indicating that a particular subscriber had generated ten detailed alerts for a particular piece of malware, and subsequently forwards another summary alert for the particular subscriber indicating that they have generated twelve detailed alerts for the particular piece of malware, the summary alert repository 224 would update the currently stored summary alert to indicate that the particular subscriber has generated twenty two detailed alerts for the particular piece of malware. It will be appreciated that if there is no current summary alert for the subscriber, or for the particular malware, the summary alert repository 224 would store the new information.

In an alternative embodiment, the reporting infrastructure may provide functionality to the aggregator 206 that allows the aggregator to update the summary alert repository 224 directly. For example the summary alert repository may provide a service such as updateSubscriberCount(SubscriberID, SignatureID) that can be called by the alert aggregator 222 each time an alert for a subscriber is processed. If an aggregator makes use of such functionality it may not be necessary to generate and forward a summary alert. As such, the alert aggregator 222 may call the update functionality provided by the reporting infrastructure 208 when it processes a received alert. The update functionality may perform checks to determine if a record for the subscriber ID already exists, and if it does update the particular malware counters stored in the summary alert repository 224. If no record is found the update functionality may add a new record for the subscriber.

It will be appreciated that the summary alert information may be stored in the summary alert repository 224 in various ways. In one illustrative example, a record may be stored for each unique subscriber ID and signature ID combination. The record may include a counter for the number of alerts generated from the signature associated with the signature ID for the subscriber ID. The record may store additional information for each record, for example if a notification has been sent to the subscriber, as described further below, if the alert summary record is new. Other information may be stored in the summary alert repository 224. The information stored in the summary alert repository 224 may also be stored in various different forms as will be appreciated by one skilled in the art.

The reporting infrastructure 208 may further comprise a subscriber notification generator 226. The subscriber notification generator 226 generates a notification to a subscriber once the subscriber's summary alerts have passed a threshold value. The threshold value may vary depending on the configuration of the system 102. For example, if the detection engine 210 used to detect malware infection provides the malware detection with a very low false-positive rate; the threshold value may be set so that if the summary alert indicates that a single detailed alert has been generated for the user a corresponding notification is generated. Alternatively, if the detection engine 210 has a higher false-positive rate the threshold may be raised in order to account for potential false positives. Additionally, the threshold may be set for the particular malware or type of malware. For example, the threshold may be set to generate a notification if a single detailed alert was generated for a particular piece of malware that is considered to be a significant threat, and also generate a notification if, for example, ten detailed alerts have been generated for a particular piece of malware that is considered to be a medium threat.

When the notification is generated, additional information associated with the signature ID of the alert, or alerts, the notification is being generated for may be retrieved. This additional information may be associated with a signature ID for the various malware signatures. The additional information may include, for example, a name of the malware, the type of malware associated with the signature ID, the severity of the malware or malware type. The notification generated by the subscriber notification generator 226 may be provided in various ways. For example, the notification may be an email sent to the subscriber, a text message sent to a phone number associated with the subscriber ID, a voicemail sent to a phone number associated with subscriber ID or as a domain name server (DNS) redirect for future traffic of the subscriber, or as a walled garden or web interstitial.

Once a notification is sent to the subscriber, the notification generator 226 may not send additional notifications for new alerts. Alternatively, if a new alert indicates infection by a different piece of malware then the malware the previous notifications was sent for, the notification generator 226 may send a new notification to the subscriber. The notification generator 226, may send periodic reminder notifications to the subscriber if the detected malware has not been remedied. Alternatively the notification generator 226 may escalate notifications if detected malware has not been remedied by the subscriber. For example, an initial notification may be sent to the subscriber, followed by a voicemail if no action is taken by the user, and then by redirecting the subscriber's web traffic through DNS redirection.

The notifications sent to a subscriber include an indication for accessing a remediation portal 228. For example, if the notification is an email, the indication may include a hypertext link, if the notification is a voicemail it may include instructions for accessing the remediation portal. If the notification is a DNS redirect, the indication may be a landing page of the remediation portal 228.

The remediation portal 228 provides the subscriber with instructions to follow in order to remove or quarantine the particular malware detected. The remediation portal may provide a dynamically generated instructions based on the specific malware that was detected on the subscriber's computer. The remediation process provided by the portal may include automated processes for automatically removing the malware from the computer. Additionally, or alternatively, the remediation process may comprise instructions for actions to be performed by the subscriber such as deleting a file, modifying configuration settings of the computer, etc.

Once the user has accessed the remediation portal 228, and completed the remediation process, the remediation portal resets the summary alerts stored in the summary alert repository 224 for the subscriber associated with the remedied malware. As such, once the subscriber has performed the remediation process, no further notifications will be received, unless a further malware infection is detected.

In addition to the remediation portal 228, the reporting infrastructure 208 may further comprise an administration portal 230 for administration of the system 102. For example the administration portal 230 may provide an administrator with various functionality such as modifying the configuration of network components, such as the forwarding frequency of the network sensor 204 and the aggregator 206, as well as the notification thresholds of the subscriber notification generator 226, and updating the alert signatures used by the detection engine 210 of the network sensor 202.

Figure 3:
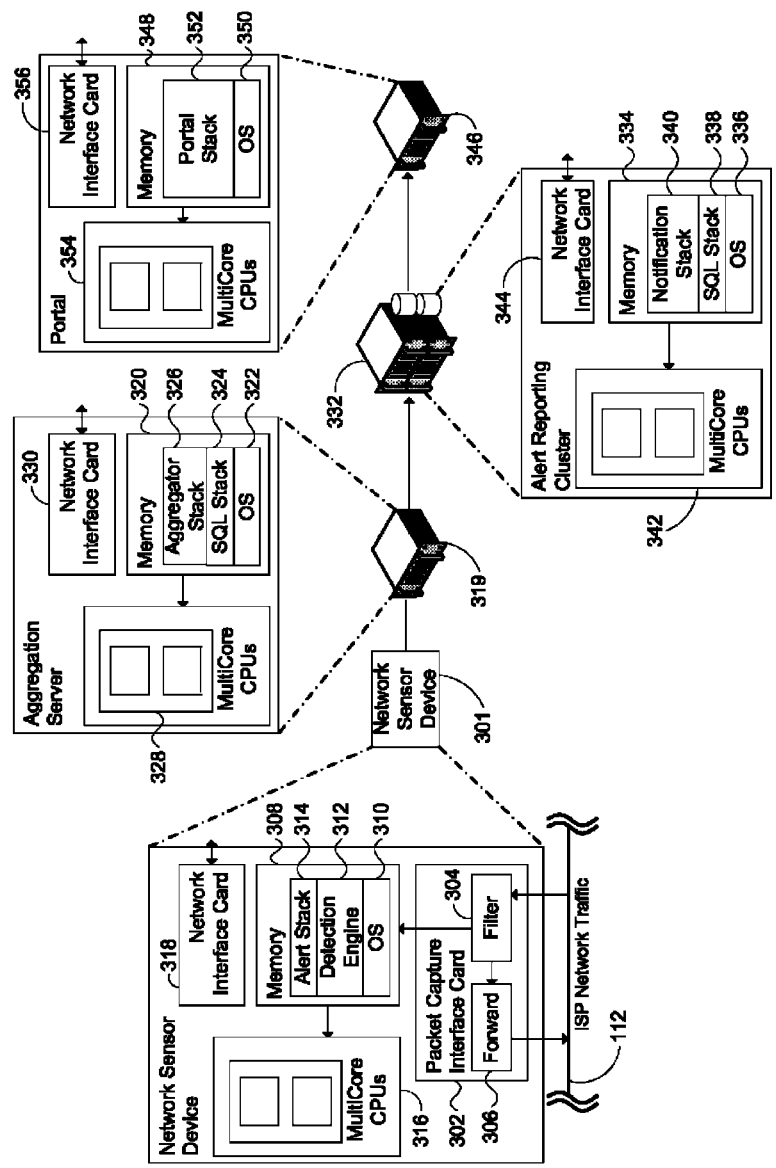
FIG. 3 depicts in a schematic, an illustrative implementation of the network based malware detection system.

FIG. 3 depicts in a schematic, an illustrative implementation of the network based malware detection system 102. The components and their functionality have been described above with reference to FIG. 2. One illustrative implementation of the components in an ISP network are described with reference to FIG. 3. It will be appreciated that the illustrative implementation described is only one implementation. One of ordinary skill in the art will realize that the components described above with reference to FIG. 2 may be implemented in numerous ways depending on the particular requirements of a particular deployment.

As shown in FIG. 3, the illustrative implementation comprises a network sensor device 301, an aggregation server 319, an alert reporting cluster 332 and a portal 346. As further described below, the network sensor device 301 implements the functionality of both the network sensor 204 and the network tap/filter 202; the aggregation server 319 implements the functionality of the aggregator 206 and the subscriber identification component 234; and the functionality of the reporting infrastructure 208 is implemented by a combination of the alert reporting cluster 332 and the portal 346.

The network sensor device 301 comprises a packet capture interface card 302 that receives packets from the ISP network 112. The packet capture interface card 302 comprises a filter component 304 that identifies packets used by the malware detection engine and sends them to the detection engine. The packet capture interface card 302 further comprises a forwarding component 306 that can forward the packets to different components, such as a further data filter for additional filtering and forwarding. The filter 304 may send the filtered packets to the detection engine by copying the packets to a computer readable memory 308, such as for example random access memory (RAM), of the network sensor device 301. In order to improve performance of the network sensor device 301, the packet capture interface card may perform a zero-copy write of the events to the memory 308. The memory 308 further stores instructions, for execution by the multi core CPUs 316. The instructions provide the network sensor device 301 with an operating system 310, such as for example CentOS (Linux), a detection engine 312 such as for example SNORT®, and an alert stack 314, for example using a Barnyard plug-in, for spooling and forwarding the alerts. The network sensor device 301 may further comprise a network interface card 318 for forwarding the alerts to the aggregation server 319.

The aggregation server 319 comprises a memory 320 for storing instructions for execution by the multi-core CPUs 328. The instructions provide an operating system 322, an structured query language (SQL) stack 324 for providing database functionality to the aggregation server 319 for storing the network ID to subscriber ID information; and an aggregator stack 326 for translating the network ID to a subscriber ID, aggregating the alerts into summary alerts and forwarding the summary alerts, or the information of the summary alerts such as the subscriber ID and signature ID associated with an alert. The alerts may be forwarded to the alert reporting cluster 332 using a network interface card 330.

The alert reporting cluster comprises a memory 334 for storing instructions for execution by the multi-core CPUs 342. The instructions provide an operating system 336, a SQL stack 338 for providing database functionality for storing the summary alerts and a notification stack 340 for generating the subscriber notifications. The SQL stack may include functionality for updating the counts associated with a particular subscriber ID and signature ID. The alert reporting cluster 332 includes a network interface card 344 for sending the subscriber notifications.

The portal 346 comprises a memory 348 for storing instructions for execution by the multi-core CPUs 354. The instructions provide an operating system 350 and a portal stack 352. The portal stack may comprise for example a web server, a SQL server and a server side script processing engine. The portal 356 includes a network interface card for accessing the portal from a subscriber's computer.

Figure 4:
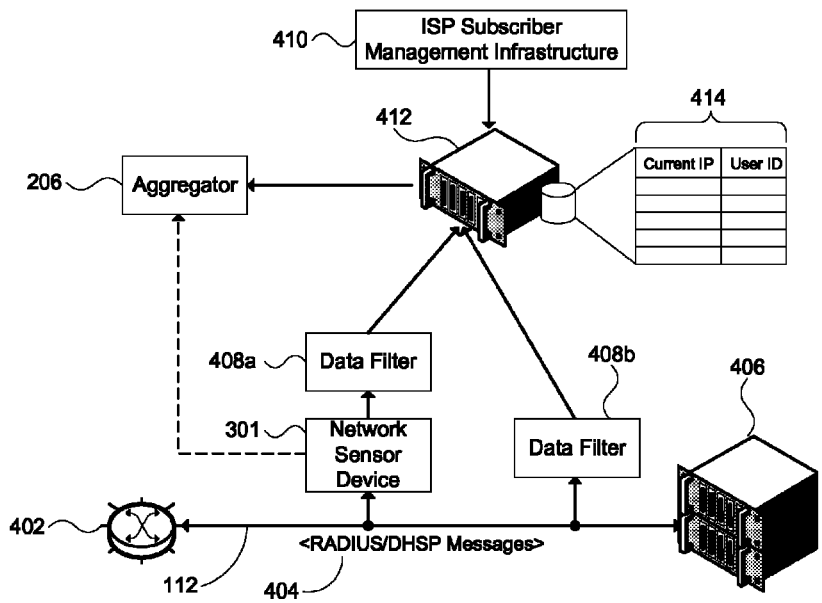
FIG. 4 depicts in a schematic an illustrative implementation of the subscriber identification component.

FIG. 4 depicts in a schematic an illustrative implementation of the subscriber identification component 234. A DHCP or RADIUS agent 402 sends a DHCP or RADIUS message to a DHCP or RADIUS server 406 over the ISP network 112. A subscriber ID database server 412 that stores an ID translation table 410 of the current network ID associated with a subscriber ID may be populated from different sources. The aggregator 206 may request a subscriber ID associated from the subscriber ID database server 412, which provides the association from the ID translation table 414.

The associations stored in the subscriber ID translation table 414 may be populated by a network sensor device 301, coupled to the ISP network in a location where it will see network traffic including the DHCP or RADIUS messages as well as additional network traffic. The network sensor device 301 may forward the DHCP and RADIUS messages to a data filter 408a. The network sensor device 301 may forward detailed alerts to an aggregator 206. The data filter 408a further processes the received DHCP/RADIUS messages in order to filter out, and forward, the messages that provide a new network ID to subscriber ID association. The messages are forwarded to the subscriber ID database server 412 which updates the ID translation table 410 with the new association.

Additionally or alternatively, a data filter 408b, which functions in the same manner as described above with respect to data filter 408a, may be located in front of the DHCP or RADIUS server so that it will only see the DHCP or RADIUS messages, and so no filtering of the network traffic needs to be done in order to identify the DHCP or RADIUS messages. The data filter 408b forwards network ID to subscriber ID associations to the subscriber ID database server 412.

The subscriber ID database server 412 may receive associations from an ISP subscriber management infrastructure 410 using an appropriate API implementation on the subscriber ID database server 412. The API may allow the subscriber ID database server 412 to request the current network identifier associated with a particular subscriber ID. The subscriber ID database server 412 may request a network ID associated with a current subscriber. For example, if the network ID associated with the subscriber ID in the ID translation table 414 is reassigned to a different subscriber, the subscriber ID database server may request a new network ID that is associated with the subscriber ID. Additionally or alternatively, if the aggregator requests a subscriber ID associated with a network ID that is not currently stored in the ID translation table 414, the subscriber ID database server 412 may request the subscriber ID from the ISP subscriber management infrastructure using the API, and store the association in the ID translation table 414.

Figure 5:
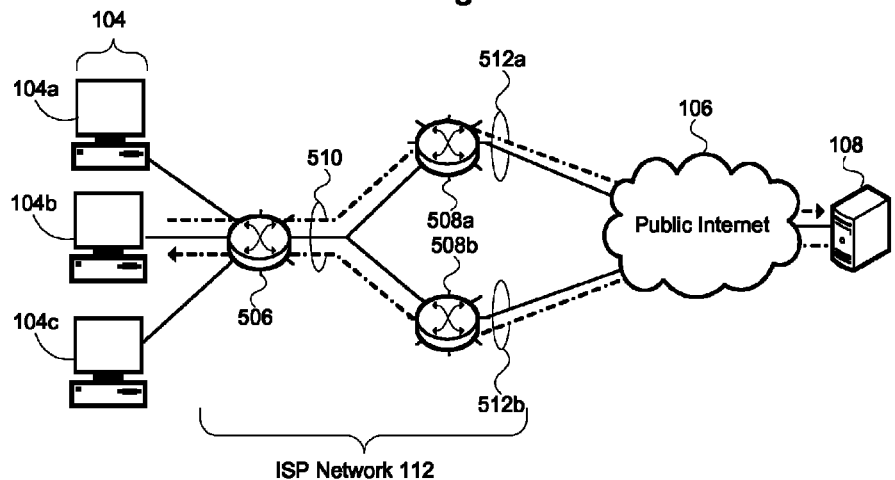
FIG. 5 depicts in a schematic illustrative network sensor deployment locations in the ISP network.

FIG. 5 depicts in a schematic illustrative network sensor deployment locations in the ISP network 112. As depicted in FIG. 5, the ISP network may connect a plurality of subscriber computers 104 to the public internet 106. The ISP network 112 may comprise a plurality of network devices including routers and switches for routing network traffic. The network devices may include edge devices such as device 506. All traffic to an from a subscriber's computer must pass through the edge device 506. A network sensor device 301 may deployed in this location 510. Advantageously a network sensor device 301 located near a subscriber's computer 104 at the edge of the ISP network will see both upstream and downstream packets for the subscriber's computer 104. This allows the detection engine to track state information for a connection and use signatures based on this session state information. Although this location for the deployment of network sensor devices has advantages, it may also require a large number of network sensors to be deployed, which would increase the capital expenditure and operating expenses for deploying the system 102.

Additionally or alternatively, network sensor devices 301 may deployed within the core of the ISP network at location where each network sensor device may be able to see, and so process, more network traffic. This may reduce the capital expenditures and operating expenses for deploying the system 102. As depicted in FIG. 5 the upstream traffic from a subscriber's computer 104b may take a different path to a web server 108 than the return downstream traffic. As depicted the upstream traffic may pass through an network device 508a on the upstream path; while it passes through a network device 508b on the downstream path. A network sensor device 301 may be deployed at the location of either, or both, network device 508a or 508b. However, a network sensor device 301 deployed in location 512a may not be able to see both directions of traffic. Similarly a network sensor device 301 deployed at location 512b may not be able to see both directions of traffic. The detection engine of network sensor devices deployed in these locations may use rules that do not require the session state information.

Alternatively, the detection engines of the network sensor devices deployed in these locations may attempt to reconstruct the session state information using the one sided traffic flow information available. By reconstructing the session state information, the network sensor devices may use signatures that are based on the session state information.

The signature set used in the network sensors may rely on the ability of the network sensor to maintain the session state of a TCP/IP connection. This includes the ability to determine if the session is in the process of being set up, is established or is being torn down. It also includes the ability to determine whether a particular packet has been transmitted by the client or the server end of the connection and the ability to reassemble sections of the TCP stream so successful pattern matching can occur.

Carrier/ISP networks may be configurations such that the data path followed by upstream traffic (coming from the client) is different from the downstream traffic (going to the client). This is known as asymmetric routing. In these cases it may not be economically feasible to position the network sensors in a location where they can see both sides of the data stream. To use the signature set that includes signatures that use the session state information, the network sensor must be able to maintain session state and reassemble the data stream while having access to traffic from one side of the bi-directional communication. This may be done using the flags in the TCP header (SYN, ACK, RST, FIN), the sequence numbers (SEQ) and the acknowledgement numbers (ACK).

The TCP header flags provide information about the state of the connection and identify the client or server in the communication. The client and server roles can be identified in the initial session setup. This is described in detail in the IETF document RFC793—Transmission Control Protocol. The client end is identified by the presence of a SYN flag set on its own. A server is identified by the SYN flag being set in combination with the ACK flag. If for some reason the sensor missed the packet flow of the initial session setup and has to pick up the flow in mid-session, the identity of the client and server may be deduced from the port numbers used in the communication. Servers are usually identified by "well known" port numbers. For example a web server uses port 80; ftp 21; telnet 23; ssh 22; etc. In cases where random or non-standard ports are used the system defaults to assuming the flow is coming from the client side, since most of the signatures are looking for content coming from the client. A TCP data stream is split into packets for transmission. In order for the network sensor to successfully match signatures that may span packets, the network sensor needs to reassemble the original data stream from the transmitted packets. In a normal TCP implementation that sees both sides of the communication, the SEQ and ACK values from the packet headers in both the transmitted and received packets are used to reconstruct the data stream. However in the case of asymmetric routing the reconstruction must be done with information from only one side of the conversation between a subscriber's computer and an end point of the communication such as a web site 106. To achieve this, the SEQ values from packets are seen may be used to predict the corresponding ACK values that would have been received in the half of the flow that isn't seen. Similarly, ACK values can be used to predict the SEQ values in the invisible half of the flow. With this information it is possible to reconstruct the session state information from one side of a traffic flow and so use alert signatures that rely on the session state in network sensors that are deployed in locations that may only see half of the traffic flow.

For complete coverage in an asymmetric routing configuration, two sensors would be deployed, one covering upstream traffic, for example at location 412a and the other downstream, for example at location 412b. In this case one sensor would be able to match signatures in traffic coming from the client end and the other in traffic coming from the server end.

Figure 6:
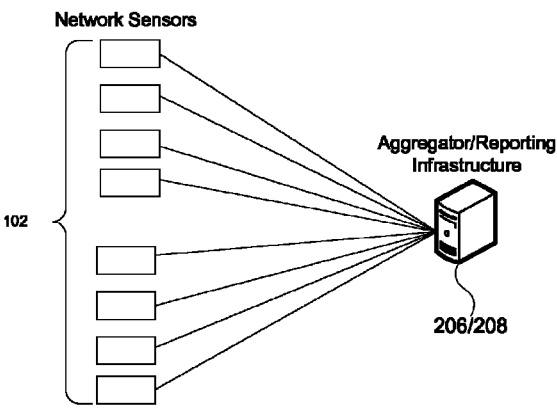
FIG. 6 depicts in a schematic an illustrative deployment of the network based malware detection system in an ISP network.

FIG. 6 depicts in a schematic an illustrative deployment of the system 102 in an ISP network. The above description of the system 102 has been described as including a single network sensor 202, an aggregator, and a reporting infrastructure in order to simplify the description of each component. As depicted in FIG. 6 the system may deployed in a medium size ISP network using a plurality of network sensors 202 and a single server that implements both aggregator and the reporting infrastructure.

Figure 7:
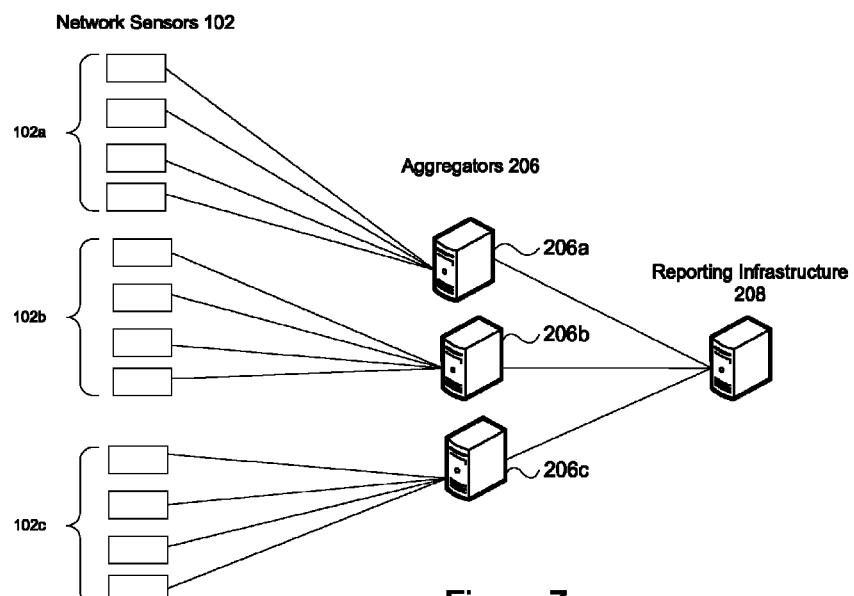
FIG. 7 depicts in a schematic another illustrative deployment of the network based malware detection system in an ISP network.

FIG. 7 depicts in a schematic another illustrative deployment of the system 102 in an ISP network. The deployment illustrated in FIG. 7 may be suitable for a large scale ISP network. The deployment may include a plurality of groups of network sensors 204a, 204b and 204c. Each group of network sensors may forward the detailed alerts to one of a plurality of aggregators 206a, 206b and 206c. Each aggregator can forward the summary alerts to the reporting infrastructure.

As will be appreciated from the above description, the use of a plurality of network sensors 204a-204c that report to a smaller number of aggregators 206a-206b, which in turn report to a single reporting infrastructure 208 allow the system 102 to easily scale to the size required to process the traffic of large ISP networks.

Figure 8:
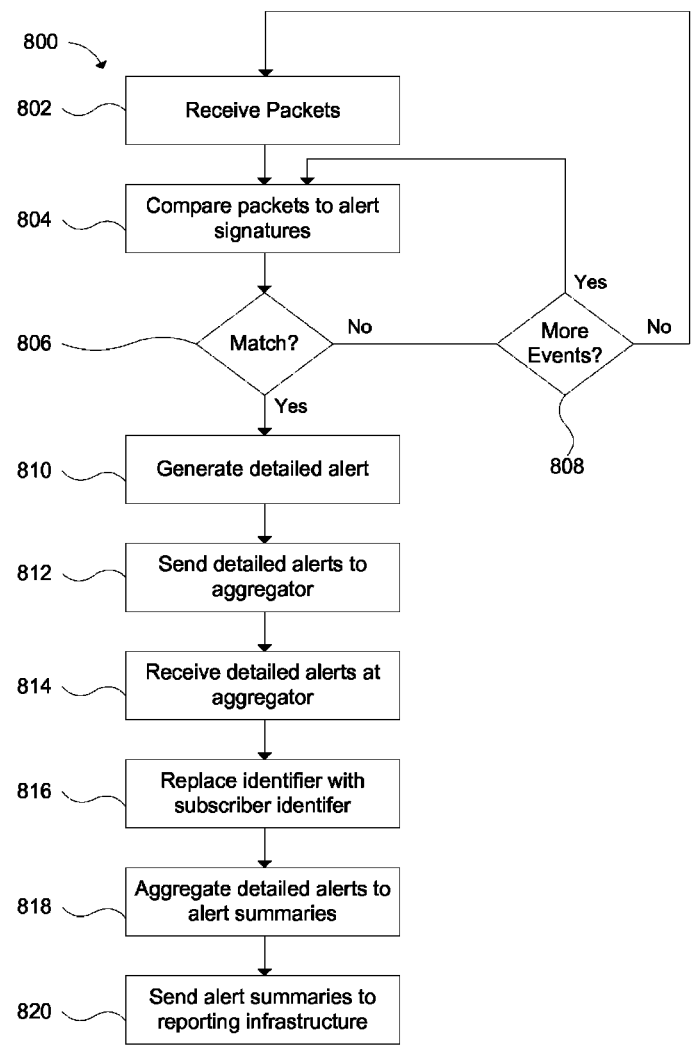
FIG. 8 depicts in a flow chart a method of determining subscribers' with a malware infection.

FIG. 8 depicts in a flow chart a method of determining subscribers' with a malware infection. The method (800) begins with receiving packets (802) that have been filtered from the ISP network traffic. The packets may be filtered based on, for example the source and destination network identifier, the source and destination port numbers and the protocol type of the packet. The method then uses a network sensor 204 to compare each or the received packets to a detection rule, or a signature of the detection rule, for a particular piece of malware (804). The network sensor determines if there was a match between a signature and packet (806), and if there was no match (No at 806), the method determines if there are more to process (808). If there are more packets to process (Yes at 808) the method compares the next packet to the detection rules (804). If there are no more packets to process (No at 808) the method waits to receive more packets (802). If it was determined that the packet matched a signature (Yes at 806), the method then generates an alert event (810) for the match according to the action specified in detection rule. The alert event may include information such as the signature ID of the signature that was matched, the source and destination network identifier of the packet that was matched, etc. The alert event may also include a time stamp indicating the time at which the alert event was generated. The method may then send the alert event or events to an aggregator (812). The alert events may be sent to the aggregator periodically and may include a plurality of alert events that have been generated since the previous sending of alert events. Alternatively, the alerts may be forwarded to the aggregator as each alert event is processed. The method then receives the forwarded alert at the aggregator (814), which replaces the network identifier in each of the forwarded alerts with an associated subscriber ID (816). The method then aggregates the detailed alerts based on the subscriber IDs into summary alerts for each subscriber ID (818). The method then sends the alert summaries alert summary information, to a reporting infrastructure (820).

Figure 9:
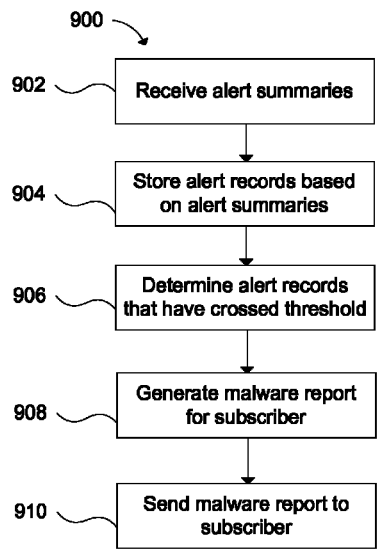
FIG. 9 depicts in a flow chart a method of notifying subscribers of a malware infection.

FIG. 9 depicts in a flow chart a method of notifying subscribers of a malware infection. The method (900) begins with receiving summary alerts from the aggregator (902), or summary alert information from the aggregator, such as an indication of a subscriber ID, associated signature Id and possibly an associated alert count. The summary alerts are stored in a summary alert repository (904). Storing the summary alerts may include updating a current summary alert by incrementing the summary alert according to a received summary alert for a corresponding subscriber. The method then determines the summary alerts that have crossed a threshold (906). A notification is generated (908) for the subscribers associated with the summary alerts that have been determined to have crossed the threshold (908). The notification is then sent to the subscriber (910).

Figure 10:
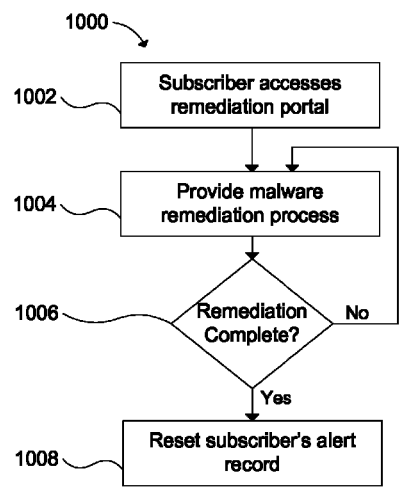
FIG. 10 depicts in a flow chart a method of remediating a malware infection.

FIG. 10 depicts in a flow chart a method of remediating a malware infection. The method 1000 begins with a subscriber receiving a notification, which includes an indication for accessing a remediation portal, from the reporting infrastructure (1002). The subscriber may then access the remediation portal (1004). The remediation portal provides the subscriber with a remediation process (1006). The remediation portal then determines if the remediation process is complete (1008). If the remediation process is complete (Yes at 1008), the remediation portal reset the summary alert of the subscriber. Resetting the summary alert may comprise deleting the summary alert associated with the subscriber, or it may comprise remove the detailed alert counters for the particular piece of malware of the summary alert. If the remediation process is not completed (No at 1008) the method may return to accessing the remediation portal again (1004).

Figure 11:
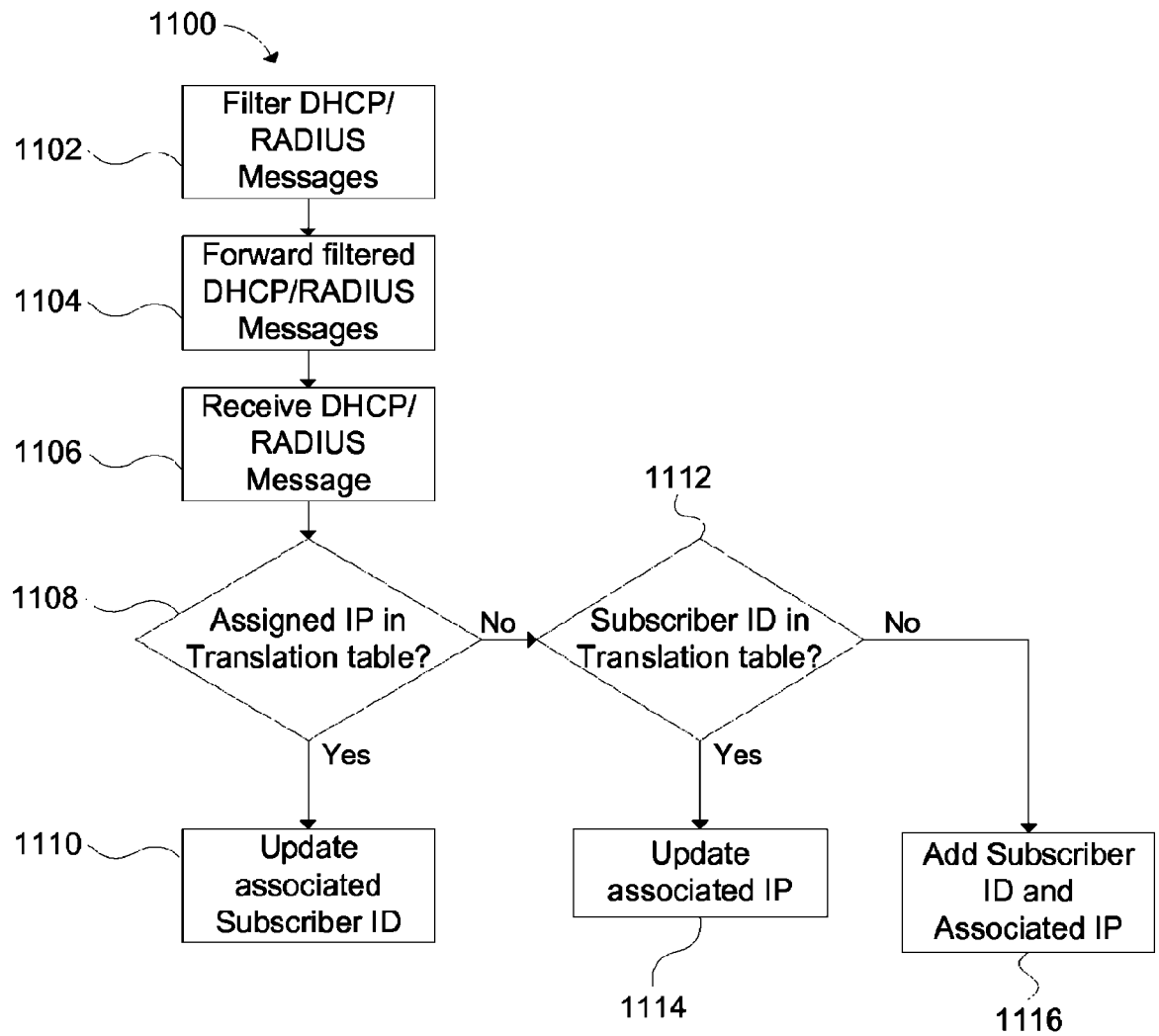
FIG. 11 depicts in a flow chart a method of maintaining a network ID to subscriber ID repository.

FIG. 11 depicts in a flow chart a method of maintaining a network ID to subscriber ID repository. The method begins with filtering DHCP or RADIUS messages (1102) from network traffic and forwarding (1104) the filtered DHCP or RADIUS messages from a network sensor or data filter. The DHCP or RADIUS messages are received at a subscriber ID database server (1106), which determines if the assigned network ID is already in a ID translation table (1108) that stores the network ID and subscriber ID associations. If the network ID is in the ID translation table (Yes 1108) the method updates the subscriber ID associated with the network ID according to the information in the DHCP or RADIUS message (1110). If the network ID is not in the ID translation table, the method determines if the subscriber ID is in the translation table (1112). If the subscriber ID is in the ID translation table (Yes at 1112), the method updates the network ID associated with the subscriber ID according to the information in the DHCP or RADIUS message (1114). If the subscriber ID is not in the ID translation table (No at 1112), the method adds the subscriber ID and the associated network ID to the ID translation table.

Although the above description has described various embodiments of a network based malware detection system, one skilled in the art will appreciate that changes and modifications may be made to the described illustrative embodiments. For example, although the above has described copying network traffic in order to analyze it, it is possible to have the network sensor act inline on the network traffic.

The above description provides a network based malware detection system and method. The components of the system, as well as their functioning have been described using various means, including flow charts specifying methods that the components of the system may implement. It is understood that the system may comprise hardware components that can be incorporated into a communication network. The hardware components may combine hardware, firmware and software in order to implement the system described herein. Alternatively, the system components may be implemented on hardware components by software expressed as a series of computer executable instructions that configure the hardware components to implement the system described herein.

What is claimed is:

1. A system for network-based detection of malware on a plurality of client computers connected to a network, the system comprising:
a network sensor coupled to the network for generating detailed alerts based on one or more received packets including a packet header associated with a client computer of the plurality of client computers, the network sensor reconstructing connection state information based on an asymmetrical traffic flow using acknowledge (ACK) and sequence (SEQ) information in the packet headers of the respective one or more received packets to maintain session state and reassemble a data stream associated with the client computer, the network sensor comprising:
a detection engine for detecting the presence of malware on the client computer by comparing data provided within the one or more packets to an alert signature to identify malware behaviour; and
an alert generation module for generating an alert when the detection engine detects the presence of malware on the client computer, the alert comprising:
a network identifier associated with the client computer; and
an identifier associated with the detected malware;
an aggregator coupled to the network, the aggregator for translating network identifiers in one or more detailed alerts associated with the client computer to corresponding subscriber identifiers and generating alert summaries based on the alerts and corresponding subscriber identifier; and
a reporting infrastructure for receiving the one or more alert summaries and generating one or more subscriber malware notifications.

2. The system of claim 1, wherein the aggregator comprises:
a subscriber identification translator for replacing the identifier associated with the client computer in each of the one or more detailed alerts with a subscriber identifier associated with the identifier; and
an alert aggregator for aggregating one or more detailed alerts having a same subscriber identifier into a single alert summary associated with the subscriber identifier and reporting one or more alert summaries associated with different subscriber identifiers.

3. The system of claim 1, wherein the reporting infrastructure comprises:
a summary alert repository storing one or more alert records, each alert record associated with a subscriber identifier and based on the one or more alert summaries with the corresponding subscriber identifier; and a subscriber report generator for generating a malware report for sending to a subscriber if the alert summary associated with the subscriber's subscriber identifier crosses a defined threshold, the malware report including an indication of the malware detected on the client computer.

4. The system of claim 3, wherein the reporting infrastructure further comprises a remediation portal for providing a malware remediation process to a subscriber for remediating the detected malware, wherein the malware report comprises an indication for accessing the remediation portal.

5. The system of claim 4, wherein the remediation portal resets the alert summary for the remediate malware associated with the subscriber identifier of the subscriber accessing the remediation portal once the remediation process has been completed.

6. The system of claim 3, wherein the reporting infrastructure further comprises:
an administration repository storing a plurality of configuration parameters of the system; and
an administration portal for:
viewing the configuration parameters; and
modifying the configuration parameters.

7. The system of claim 3, wherein the summary alert repository further stores:
the detailed alerts; and
network-wide alert summaries comprising an indication of a number of malware alerts generated in the network, and
wherein the system further comprises:
a network traffic tap for providing packets to the network sensor, the network traffic tap comprising a filter for identifying the packets to be provided to the network sensor.

8. The system as claimed in claim 7, wherein the filter of the network traffic tap further identifies dynamic host configuration protocol (DHCP) request and remote authentication dial in user service (RADIUS) requests, the system further comprising:
a subscriber identification module for providing the association between the subscriber identifier and the identifier associated with the client computer, the subscriber identification module comprising:
an identifier module for receiving the DHCP requests or the RADIUS requests and detecting a new association between the subscriber identifier and the identifier associated with the client computer; and
a subscriber identifier repository storing a current association between the identifier and the subscriber identifier.

9. The system as claimed in claim 1, comprising
a plurality (n) of network sensors deployed throughout the network, each network sensor of the plurality of network sensors for generating detailed alerts; and
a plurality (m) of aggregators, each aggregator of the plurality of aggregators for aggregating detailed alerts generated by a subset of network sensors of the plurality of network sensors.

10. The system of claim 1, wherein the system further comprises:
an alert spooler for reporting one or more detailed alerts; and
a local alert repository for storing the detailed alert generated by the alert generation module, wherein the alert spooler retrieves the one or more detailed alerts from the local alert repository for reporting.

11. The system of claim 10, wherein the system further comprises an alert signature repository for storing a plurality of detection rules, each detection rule comprising:
a signature for identifying the presence of malware based upon at least the received user packet, the signature identifying data contained in the packet which is associated with malware behaviour; and
a signature identifier indicating the malware associated with the signature.

12. An apparatus coupled to a network for network-based detection of malware and aggregating a plurality of alerts associated with one or more client computers coupled to the network, the apparatus comprising:
a computer readable memory for storing instructions; and
a processing unit for executing the instructions stored in the computer readable memory, when executed by the processing unit, the instructions configuring the apparatus to provide:
a network sensor for generating detailed alerts based on one or more received packets including a packet header associated with a client computer of the one or more client computers, the network sensor reconstructing connection state information based on an asymmetrical traffic flow using acknowledge (ACK) and sequence (SEQ) information in the packet headers of the respective one or more received packets to maintain session state and reassemble a data stream associated with the client computer, the network sensor comprising:
a detection engine for detecting the presence of malware on the client computer by comparing data provided within the one or more packets to an alert signature to identify malware behaviour; and
an alert generation module for generating an alert when the detection engine detects the presence of malware on the client computer, the alert comprising:
a network identifier associated with the client computer; and
an identifier associated with the detected malware;
a subscriber identification translator for receiving the alert of the plurality of alerts, the alert comprising the network identifier associated with one of the one or more client computers and the malware identifying the malware detected in network traffic associated with the client computer, the subscriber identification translator further for replacing the network identifier in the alert with a subscriber identifier associated with the network identifier; and
an alert aggregator for determining one or more summary alerts, each summary alert corresponding to one or more alerts each having a same subscriber identifier and comprising the subscriber identifier and an indication of a number of alerts associated with the subscriber, the alert aggregator further for reporting the one or more summary alerts.

13. The apparatus as claimed in claim 12, wherein the alert aggregator reports the one or more summary alerts by at least one of:
sending summary alert information to a reporting infrastructure using functionality provided by the reporting infrastructure when the summary alert is determined; or
sending a plurality of summary alerts to the reporting infrastructure periodically.

14. A network-based method of detecting the presence of malware on a plurality of client computers connected to a network, the method comprising:
  receiving one or more packets at a network sensor, each packet including a packet header associated with a client computer of the plurality of client computers, the network sensor reconstructing connection state information based on an asymmetrical traffic flow using acknowledge (ACK) and sequence (SEQ) information of the packet headers of the one or more received packets to maintain session state and reassemble a data stream associated with the client computer;
  detecting at the network sensor the presence of malware on the client computer by comparing the one or more packets to an alert signature to identify malware behaviour;
  generating at the network sensor a detailed alert when the presence of malware is detected on the client computer, the detailed alert comprising:
    an identifier associated with the client computer;
    a malware identifier indicating the detected malware; and
    a time stamp;
  sending one or more detailed alerts generated at the network sensor to an aggregator;
  receiving at the aggregator the one or more detailed alerts;
  replacing the identifier associated with the client computer in each of the one or more detailed alerts with a subscriber identifier associated with the identifier
  aggregating one or more detailed alerts having a same subscriber identifier into a single alert summary associated with the subscriber identifier; and
  sending one or more alert summaries associated with different subscriber identifiers to a reporting infrastructure.

15. The method of claim 14, further comprising:
  receiving at the reporting infrastructure the one or more alert summaries;
  storing in a summary alert repository one or more alert records, each alert record associated with a subscriber identifier and based on the one or more alert summaries with a corresponding subscriber identifier;
  generating a malware report when the alert summary associated with the subscriber identifier crosses a defined threshold, the malware report including an indication of the malware detected on the client computer; and
  sending the generated malware report to the associated subscriber.

16. The method of claim 15, further comprising:
  providing at a remediation portal a malware remediation process to a subscriber for remediating malware, wherein the malware report comprises an indication for accessing the remediation portal; and
  resetting the alert summary for the remediated malware associated with the subscriber identifier of the subscriber accessing the remediation portal once the remediation process has been completed.

17. The method of claim 15, further comprising storing in the summary alert repository:
  the detailed alerts; and
  network-wide alert summaries comprising an indication of a number of malware alerts generated in the network.

18. The method as claimed in claim 17, further comprising:
  filtering at the network tap dynamic host configuration protocol (DHCP) requests and RADIUS requests;
  sending the filtered DHCP requests and RADIUS requests to a subscriber identification module;
  receiving at the subscriber identification module the filtered DHCP requests or RADIUS requests;
  detecting a new association between the subscriber identifier and the identifier associated with the client computer;
  storing in a subscriber identifier repository a current association between the identifier and the subscriber identifier; and
  providing the current association to the aggregator.

19. The method of claim 14, further comprising:
  receiving a copy network traffic at a network tap;
  filtering the packets from the network traffic; and
  sending the packets to the network sensor.

* * * * *